United States Patent [19]
Hashimoto et al.

[11] Patent Number: 5,742,497
[45] Date of Patent: Apr. 21, 1998

[54] COLD-CATHODE FLUORESCENT LAMP LIGHTING DEVICE

[75] Inventors: Kazuo Hashimoto; Hirokazu Nakayoshi, both of Kanagawa, Japan

[73] Assignee: Sony Corporation, Tokyo, Japan

[21] Appl. No.: 715,580

[22] Filed: Sep. 19, 1996

[30] Foreign Application Priority Data

Sep. 21, 1995 [JP] Japan ................... 7-267740

[51] Int. Cl.⁶ .................... H02M 7/538; H05B 37/02
[52] U.S. Cl. ........................ 363/133; 315/DIG. 7
[58] Field of Search .............. 363/56, 133; 362/26, 362/31; 349/70; 315/DIG. 5, DIG. 7, 307

[56] References Cited

U.S. PATENT DOCUMENTS

| | | | |
|---|---|---|---|
| 5,019,749 | 5/1991 | Ito | 315/DIG. 7 |
| 5,105,127 | 4/1992 | Lavaud et al. | 315/DIG. 4 |
| 5,495,405 | 2/1996 | Fujimura et al. | 363/133 |

*Primary Examiner*—Stuart N. Hecker
*Attorney, Agent, or Firm*—Ronald P. Kananen

[57] ABSTRACT

A cold-cathode fluorescent lamp lighting device which enables to perform high-efficiency lighting of a cold-cathode fluorescent lamp. The direct-current voltage is converted into the alternating voltage by the voltage converting means, and when the alternating voltage is boosted to the stated high-tension alternating voltage by the transforming means, the ratio of step-up transformation by the transforming means with respect to the alternating voltage is adjusted by the change-over means, so that the alternating voltage is boosted into the first high-tension alternating voltage at the time to start lighting of the cold-cathode fluorescent lamp, and the alternating voltage is boosted into the second high-tension alternating voltage at the time of steady-state lighting of the cold-cathode fluorescent lamp, therefore the first high-tension alternating voltage and the second high-tension alternating voltage of the voltage values which are respectively needed, as the minimum requirements, at the time to start lighting and the time of steady-state lighting of the cold-cathode fluorescent lamp can be obtained with the simple circuit constitution, in this way, a cold-cathode fluorescent lamp lighting device which is capable of high-efficiency lighting of a cold-cathode fluorescent lamp can be realized.

9 Claims, 4 Drawing Sheets

COLD-CATHODE FLUORESCENT LAMP LIGHTING DEVICE

BACKGROUND OF THE INVENTION

1. Field of the Invention

This invention relates to a cold-cathode fluorescent lamp lighting device, and more particularly, is applicable to a cold-cathode fluorescent lamp lighting device for lighting a cold-cathode fluorescent lamp employed in blacklightiing a liquid display (LCD) panel which is mounted on a video-tape-recorder integrated with a camera (referred to as a VTR integrated with camera, hereinafter).

2. Description of the Related Art

Previously, in a cold-cathode fluorescent lamp lighting device of this kind, a direct-current voltage is converted into a high-tension alternating voltage by a "direct-current voltage/alternating voltage" inverter circuit (referred to as a DC/AC inverter circuit, hereinafter). Then the resulting high-tension alternating voltage is supplied to a cold-cathode fluorescent lamp, so that the cold-cathode fluorescent lamp is lit.

In a cold-cathode fluorescent lamp, the value of the alternating voltage which is required, at a minimum, to start lighting the lamp is usually different from the value which is required, at a minimum, for keeping the lamp lit. The value of the alternating voltage which is required to start lighting the lamp is about two or three times that which is required for keeping the lamp lit.

A fixed output-voltage type DC/AC inverter circuit is employed in the cold-cathode fluorescent lamp lighting device. Thus the high-tension alternating voltage which has been employed to start lighting the lamp is still supplied to the cold-cathode fluorescent lamp during normal operation.

Therefore, in the cold-cathode fluorescent lamp lighting device, it has been difficult to ensure both efficient lighting facility at the time the cold-cathode fluorescent lamp is started, and stable lighting performance thereafter.

In order to solve such problems, FIG. 1 shows a cold-cathode fluorescent lamp lighting device which is adapted to switch from the alternating voltage value needed at the time the cold-cathode fluorescent lamp is lit to the alternating voltage value needed at during steady-state operation thereafter.

In a cold-cathode fluorescent lamp lighting device 1, a direct-current voltage is supplied from a power supply 2, which is composed of cells, etc., to a constant-voltage power supply 3, which is composed of an up-converter and a down-converter. The constant-voltage power supply 3 converts the supplied direct-current voltage into the required direct-current constant voltage, and supplies it to a DC/AC inverter circuit 4. Then, the DC/AC inverter circuit 4 converts the supplied direct-current constant voltage into the required high-tension alternating voltage, and supplies it to a cold-cathode fluorescent lamp 5.

In this case, in the cold-cathode fluorescent lamp lighting device 1, the constant-voltage power supply 3 switches between the voltage values of the direct-current constant voltage in response to the lighting state of the cold-cathode fluorescent lamp 5 (that is whether the lamp is being lit or is already lit) and supplies the voltage to the DC/AC inverter circuit 4. The DC/AC inverter circuit 4 converts the supplied direct-current constant voltage into a high-tension alternating voltage value which is corresponding to the voltage value of the direct-current constant voltage.

In fact, in the cold-cathode fluorescent lamp lighting device 1, in the case where the power supply 2 is composed of cells, the voltage value of the direct-current voltage which is supplied from the power supply 2 to the constant-voltage power supply 3 varies ranging from 5V to 10V or so. Therefore, the up-converter and the down-converter, which have been included in the constant-voltage power supply 3, change and convert the direct-current voltage which has been supplied from the power supply 2 into the direct-current voltage values of about 6V and about 5V, respectively, to light the lamp initially or maintain the lit state of the lamp thereafter.

The DC/AC inverter circuit 4 also converts the direct-current constant voltages of about 6V and about 5V, which have been supplied from the constant-voltage power supply 3, into the required alternating voltages respectively. The DC/AC inverter circuit 4 then boosts the alternating voltages into the stated high-tension alternating voltages, respectively, on the basis of the stated step-up transformation ratio. In this way, the DC/AC inverter circuit 4 supplies the high-tension alternating voltages which are respectively required, at a minimum, to start lighting the lamp and maintain the lighting of the cold-cathode fluorescent lamp 5 thereafter.

In the cold-cathode fluorescent lamp lighting device 1 which is composed as described, there has been a problem in that the circuit scale of the cold-cathode fluorescent lamp lighting device 1 becomes relatively large because the constant-voltage power supply 3 which is composed of an up-converter and a down-converter is employed.

Therefore, in the case of a VTR which has been integrated with a camera, there have been problems in that a large space is needed to mount the cold-cathode fluorescent lamp lighting device 1, and in that the constitution of the whole device is thus made more complicated.

In the cold-cathode fluorescent lamp lighting device 1, the direct-current constant voltage value which is needed at a minimum in the DC/AC inverter circuit 4 when lighting is to be started is higher than the direct-current constant voltage value which is needed at a minimum to maintain lighting thereafter.

Therefore, in the case where a VTR 6 is used which has been integrated with a camera and composed of a camera/VTR circuit 7, a LCD panel circuit 8, and the cold-cathode fluorescent lamp lighting device 1 as shown in FIG. 2, there has been such a problem in that when the frequency with which the VTR integrated with camera 6 is used increases, the number of the lamp 5 is turned ON and OFF. also increases, and the electric power consumption is increased, correspondingly.

As an approach for solving problems like this, a method can be conceived in which the down-converter of the constant-voltage power supply 3 converts the direct-current voltage which has been supplied from the power supply 2 into a direct-current constant voltage having a voltage value of about 3V, to maintain lighting of the cold-cathode fluorescent lamp 5, in the cold-cathode fluorescent lamp lighting device 1.

However, according to this method, there has been a problem in that the efficiency of the step-up transformation is lowered where the DC/AC inverter circuit 4 boosts the direct-current constant voltage having the voltage value of about 3V which has been supplied from the constant-voltage power supply 3 into the stated high-tension alternating voltage. In comparison, the case where the DC/AC inverter circuit 4 boosts the direct-current constant voltage having the voltage value of about 5V which has been supplied from the constant-voltage power supply 3 into the stated high-tension alternating voltage is more efficient, because the step-up transformation ratio is fixed for boosting the direct-current constant voltage which has been supplied to the DC/AC inverter circuit 4 into the high-tension alternating voltage of the stated voltage value.

In fact, to construct the DC/AC inverter circuit 4 which is employed in the cold-cathode fluorescent lamp lighting device 1, a circuit can be conceived which is composed of a high-tension transformer T10 having the stated step-up transformation ratio, transistors Q11 and Q12 which have been connected to the primary coil TL1 of the high-tension transformer T10 in a symmetrical form, a coil TL2 (this is referred to as the switching control coil, hereinafter) which has been provided on the primary side of the high-tension transformer T10 for the sake of alternative switching of the transistors Q11 and Q12, etc., as shown in FIG. 3.

In this case, the DC/AC inverter circuit 4 when a direct-current voltage has been supplied to from the constant-voltage power supply 3, the voltage which is generated in the switching control coil TL2 of the high-tension transformer T10 is repeatedly reversed, and the transistors Q11 and Q12 are alternatingly switched, correspondingly. At this time, in the high-tension transformer T10, an electric current alternatively flows through first the side coil and then the other side coil of the primary coil TL1 which has been nearly bisected by the center tap A. This generates an alternating voltage from the direct-current voltage in the primary coil TL1.

As a result, the high-tension transformer T10 boosts the generated alternating voltage, on the basis of the step-up transformation ratio which is in proportion to the turn ratio of the primary coil TL1 of the high-tension transformer T10 to the secondary coil TL3. Thus, in the DC/AC inverter circuit 4, a high-tension alternating voltage which has been boosted to about 2 KVpp to 5 KVpp may be generated on the secondary side of the high-tension transformer T10.

SUMMARY OF THE INVENTION

In view of the foregoing, an object of this invention is to provide a cold-cathode fluorescent lamp lighting device which is able to light a cold-cathode fluorescent lamp in a highly efficient manner.

The foregoing object and other objects of the invention have been achieved by the provision of a cold-cathode fluorescent lamp lighting device which comprises: a voltage converting means for converting a direct-current voltage into an alternating voltage; a voltage transforming means for boosting the alternating voltage into the stated high-tension alternating voltage; and a change-over means for adjusting the step-up transformation ratio of the voltage transforming means against the alternating voltage and for changing the alternating voltage into a first high-tension alternating voltage and a second high-tension alternating voltage of which the second high-tension voltage value is lower than that of the first high-tension alternating voltage. The change-over means changes the alternating voltage to the first high-tension alternating voltage when initially lighting the cold-cathode fluorescent lamp, and changes the alternating voltage to the second high-tension alternating voltage to maintain the lighting of the cold-cathode fluorescent lamp thereafter.

The direct-current voltage is converted into the alternating voltage by the voltage converting means, and the step-up transformation ratio of the voltage transforming means against the alternating voltage is adjusted by the change-over means when the alternating voltage is boosted into the stated high-tension alternating voltage by the voltage transforming means, wherein the alternating voltage is boosted into the first high-tension alternating voltage when lighting of the cold-cathode fluorescent lamp is to be started, and the alternating voltage is boosted into the second high-tension alternating voltage maintain the lighting of said cold-cathode fluorescent lamp. Therefore, it is possible with a simple circuit to obtain the first high-tension alternating voltage and the second high-tension alternating voltage of the voltage values which are respectively needed, as minimum requirements, at the appropriate time to either start lighting the lamp or maintain lighting of the cold-cathode fluorescent lamp.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) The First Embodiment

Figure 1:
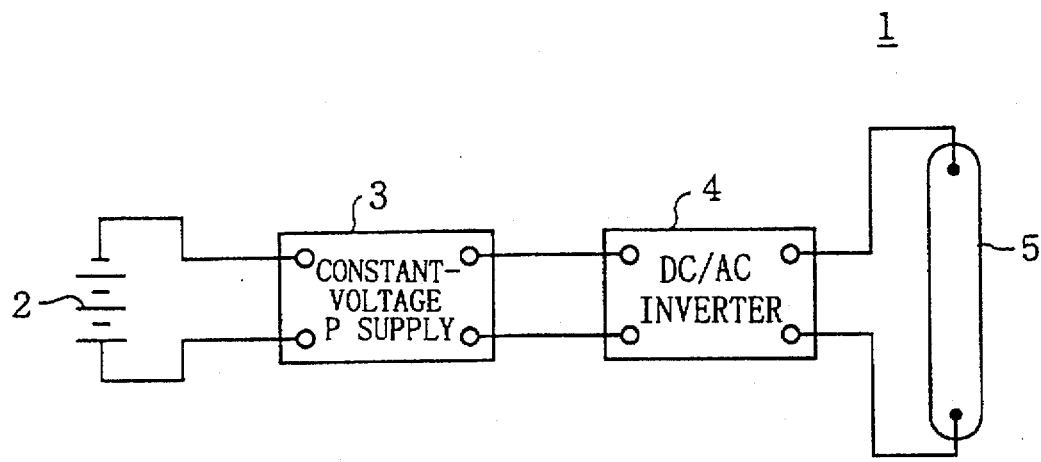
FIG. 1 is a block diagram showing the circuit configuration of the conventional cold-cathode fluorescent lamp lighting device.
Figure 2:
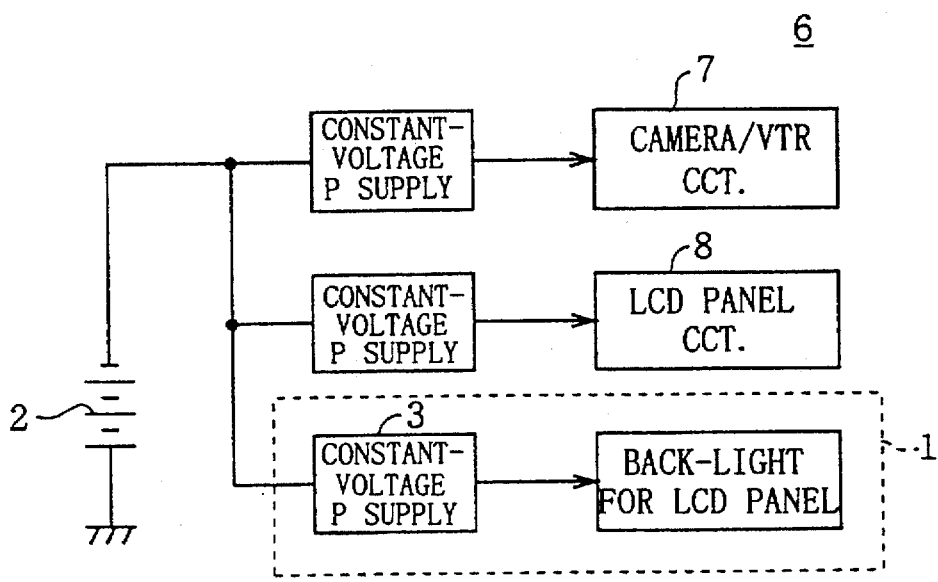
FIG. 2 is a block diagram showing the schematic circuit configuration of the conventional VTR which is integrated with a camera.
Figure 3:
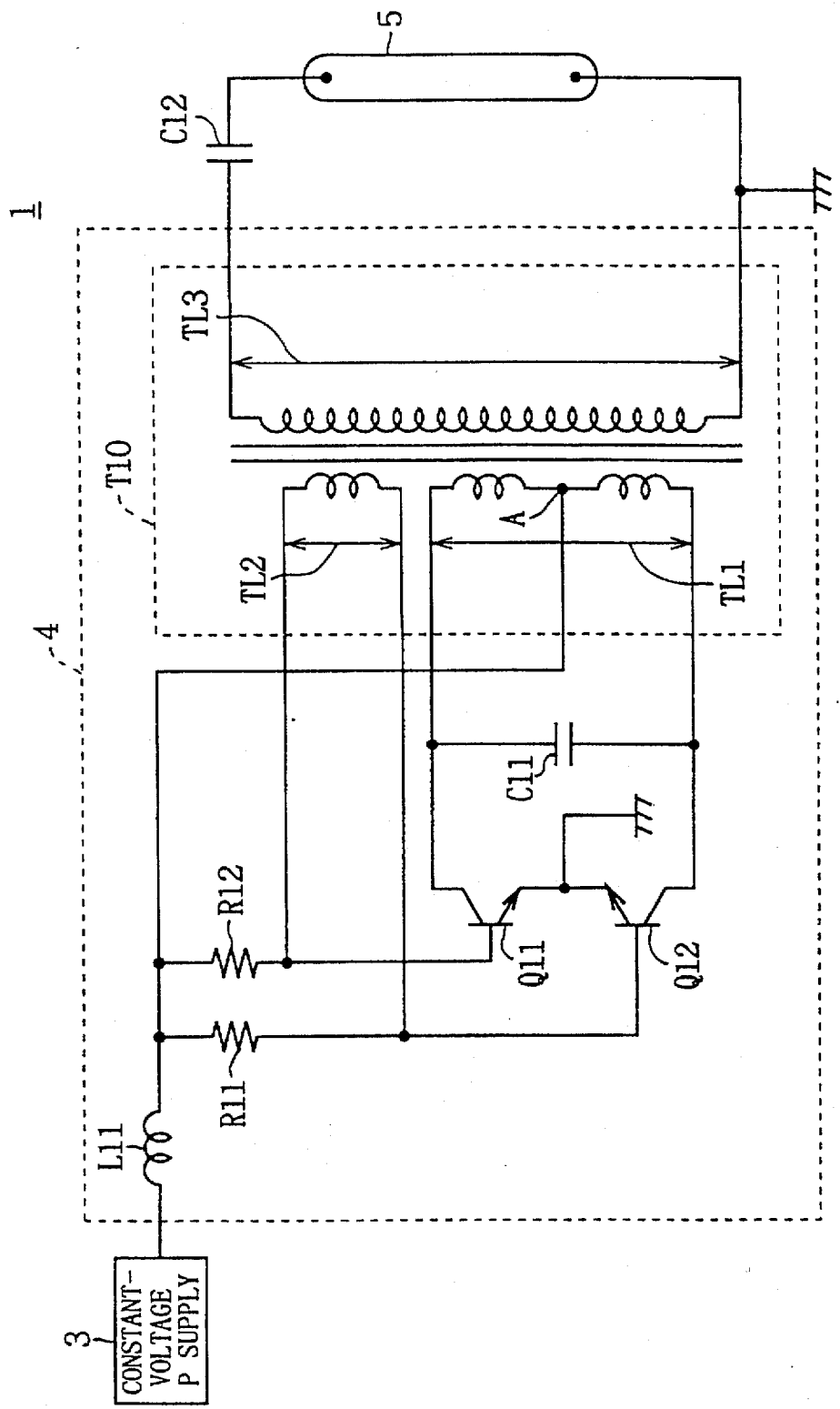
FIG. 3 is a connection diagram showing the circuit configuration of the DC/AC inverter circuit of the cold-cathode fluorescent lamp lighting device of a conventional design.
Figure 4:
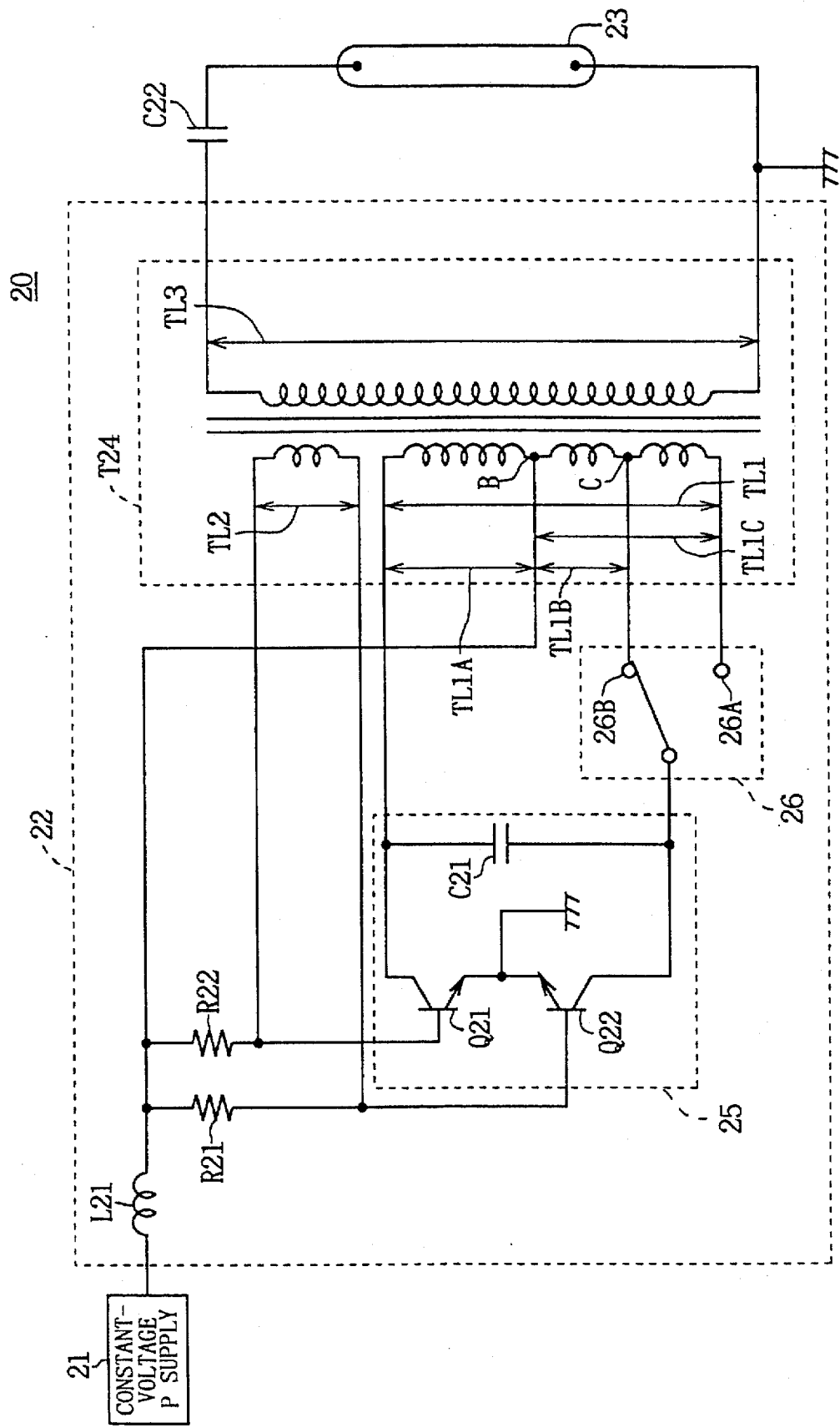
FIG. 4 is a connection diagram showing the circuit configuration of the cold-cathode fluorescent lamp lighting device according to a first embodiment of the present invention.

Referring to FIG. 4, the reference numeral 20 shows, as a whole, a cold-cathode fluorescent lamp lighting device of the first embodiment, the construction of which is somewhat similar to that of the conventional cold-cathode fluorescent lamp lighting device 1 shown in FIG. 3.

In the cold-cathode fluorescent lamp lighting device 1, a direct-current voltage is supplied from a power source (not shown) which may be composed of an externally mounted primary cell, a secondary cell, a direct-current power supply, or the like to a constant-voltage power supply 21. The constant-voltage power supply 21 converts the direct-current voltage into a direct-current constant voltage of the stated voltage value, and then supplies it to a DC/AC inverter circuit 22.

The DC/AC inverter circuit 22 generates an alternating voltage from the direct-current voltage, changes between to respective step-up transformation ratios in response to whether it is initially lighting the lamp or is maintaining the lighting of the cold-cathode fluorescent lamp 23, boosts the alternating voltage to high-tension alternating voltages which are respectively required, as minimum requirements, for initially lighting and for maintaining the lighting of the lamp, and then supplies them to the cold-cathode fluorescent lamp 23.

In this way, the cold-cathode fluorescent lamp 23 can be lighted on the basis of the high-tension alternating currents of the voltage values which are respectively corresponding to the initial lighting of the lamp and maintaining the lighting of the lamp.

In the case of the DC/AC inverter circuit 22, one end of an oscillating-circuit driving coil L21 is connected to an output terminal of the constant-voltage power supply 21.

At the other end of the coil L21, one ends of the resistors R21 and R22, and, for instance, an intermediate tap (this is referred to as the first intermediate tap, hereinafter) B in the primary coil TL1 of a high-tension transformer T24 are connected in parallel.

Connected to the other ends of the resistors R21 and R22 are a switching control coil TL2 which has been provided on the primary side of the high-tension transformer T24, and a switching-circuit part 25 for performing a switch-controlling of a direct current which is alternately switched by the switching control coil TL2 and caused to flow through the primary coil TL1.

The switching-circuit part 25 is constructed such that the bases of transistors Q21 and Q22 are connected to the other ends of the resistors R21 and R22 respectively. The emitters of the transistors Q21 and Q22 are connected to the ground, and a capacitor C21 is connected between collectors of the transistors Q21 and Q22.

In the switching-circuit part 25, one end of the primary coil TL1 of the high-tension transformer T24 is connected to the collector of the transistor Q21, and a change-over circuit 26 is connected to the collector of the transistor Q22.

The change-over circuit 26 is arranged such that one contact 26A of it is connected to the other end of the primary coil TL1 of the high-tension transformer T24, and the other contact 26B is connected to an intermediate tap (this is referred to as the second intermediate tap, hereinafter) C which has been provided on an intermediate position between the other end of the primary coil TL1 and the first intermediate tap B. Thus, the user is able to perform change-over controlling of these contacts 26A and 26B by hand.

Therefore, the change-over circuit 26 is able to change the turn number of the primary coil TL1 of the high-tension transformer T24, on the basis of change-over controlling by the user.

In fact, in the switching circuit 25, the direct current which is based on the direct-current voltage supplied from the constant-voltage power supply 21 is supplied to the bases of the transistors Q21 and Q22 sequentially via the coil L21 and the resistors R21 and R22 respectively. Then, either the transistor Q21 or the transistor Q22 achieves an ON state.

If the transistor Q21 is turned ON first, then the transistor Q22 is OFF, and a resonance circuit which is comprised of the primary coil TL1 and the capacitor C21 is supplied with a resonance current from the first intermediate tap B of the primary coil TL1. A resonance voltage is added between the collector and the base of the transistor Q22. The resonance voltage is induced in the switching-control coil TL2, and the resonance voltage is positively fedback to the base of the transistor Q21, so that the transistor Q21 is caused to stay in the ON state until the resonance voltage is inverted into "negative".

In this case, in the primary coil TL1, a voltage which is corresponding to a half-wave of a sine-wave alternating voltage (this is referred to as a plus-side half-wave voltage, hereinafter) is generated within a coil (this is referred to as the primary-side first coil, hereinafter) TL1A which lies between the first intermediate tap B of the primary coil TL1 and one end of the primary coil TL1.

In the switching-circuit part 25, when the resonance voltage which has been positively fedback to the base of the transistor Q21 is inverted into "negative", the transistor Q22 becomes turns ON as the base potential of it becomes "positive", and the transistor Q21 turns OFF state. Thereupon, the resonance circuit which is comprised of the primary coil TL1 and the capacitor C21 is supplied with the resonance current from the first intermediate tap B of the primary coil TL1. The resonance voltage is added between the collector and the base of the transistor Q21. Moreover, a resonance voltage is induced in the switching-control coil TL2, and the resonance voltage is positively fedback to the base of the transistor Q22. This causes the transistor Q22 to stay in the ON state until the resonance voltage is inverted to "negative".

In this case, in the primary coil TL1, a voltage which is corresponding to a residual half-wave of a sine-wave alternating voltage (referred to as a minus-side half-wave voltage, hereinafter) is generated within a coil (referred to as the primary-side second coil, hereinafter) TL1B which lies between the first intermediate tap B of the primary coil TL1 and the second intermediate tap C or within a coil (referred to as the primary-side third coil, hereinafter) TL1C which lies between the first intermediate tap B of the primary coil TL1 and the other end of the primary coil TL1.

After that, in the switching circuit 25, when the resonance voltage which has been positively fedback to the base of the transistor Q22 is inverted to "negative", the transistor Q21 turns ON and the transistor Q22 turns OFF. Operation which are similar to the abovementioned operations are further repeated by turns, and so the transistors Q21 and Q22 are alternately switched, so that the alternating voltage can be generated in the primary coil TL1 of the high-tension transformer T24.

In this case, the high-tension transformer T24 includes, in its secondary side, a secondary coil TL3 having the stated number of turns, and boosts the alternating voltage which has been generated in the primary coil TL1 into the stated high-tension alternating voltage.

In fact, when the change-over circuit 26 has been turned toward the contact 26A, the alternating voltage is generated in the high-tension transformer T24, by the primary-side first coil TL1A and the primary-side third coil TL1C in which the numbers of turns are nearly bisections of the number of turns of the primary coil TL1.

In this case, in the high-tension transformer T24, the ratio of the number of turns of the secondary coil TL3 to the number of turns of the primary-side first coil TL1A is nearly the same as the ratio of the number of turns of the secondary coil TL3 to the number of turns of the primary-side third coil TL1C. Accordingly, the step-up transformation ratios are also nearly same. Therefore, the high-tension transformer T24 boosts the alternating voltage which has been generated in the primary coil TL1 into the high-tension alternating voltage of which maximum values of the plus-side half-wave voltage and the minus-side half-wave voltage are nearly the same.

Moreover, when the change-over circuit 26 has been turned toward the contact 26B, the alternating voltage is generated in the high-tension transformer T24, by the primary-side first coil TL1A and the primary-side second coil TL1B in which the number of turns is nearly a bisection of the number of turns of the primary-side third coil TL1C.

In this case, in the high-tension transformer T24, the ratio of the number of turns of the secondary coil TL3 to the number of turns of the primary-side second coil TL1B is larger than the ratio of the number of turns of the secondary coil TL3 to the number of turns of the primary-side first coil.

Therefore, in the high-tension transformer T24, the step-up transformation ratio of the secondary coil TL3 to the first-side second coil TL1B can be increased, so that the maximum value of the voltage which corresponds to the minus side of the high-tension alternating voltage which is the boosted minus-side half-wave voltage (or the boosted plus-side half-wave voltage) can be increased over the maximum value of the voltage which corresponds to the plus side of the high-tension alternating voltage which is the boosted plus-side half-wave voltage (or the boosted minus-side half-wave voltage). Thus, in the high-tension transformer T24, the alternating voltage which has been generated in the primary-side can be boosted to a high voltage value of high-tension alternating voltage where the change-over circuit 26 has been turned toward the contact 26B, as compared with when the change-over circuit 26 has been turned toward the contact 26A.

In this way, when lighting of the cold-cathode fluorescent lamp 23 is to be started, the DC/AC inverter circuit 22 generates the alternating voltage while the change-over circuit 26 is in connection with the contact 26B, and boosts the alternating voltage into the high-tension alternating voltage of the required voltage value which is needed at a minimum to start lighting the lamp when the cold-cathode fluorescent lamp 23 is lit, the DC/AC inverter circuit 22 generates an alternating voltage while the change-over circuit 26 is in connection with the contact 26A, and boosts the alternating voltage into the high-tension alternating voltage which is needed at a minimum to maintain the lamp in a lit state, and which is lower than the high-tension alternating voltage required to light the lamp.

In this connection, in the case of this embodiment, the DC/AC inverter circuit 22 has been enabled to boost the alternating voltage into the high-tension alternating voltage of the voltage value of about 1.2 KVpp to 1.3 KVpp which can maintain the discharging state (that is, keeping the lamp lit) even though a low temperature (for instance, −5° C. or so) exists. The cold-cathode fluorescent lamp 23 has a tube diameter of about φ3 mm for use in a three inch LCD panel. The circuit 22 has been enabled to boost the alternating voltage into the high-tension alternating voltage of the voltage value of 2 KVpp or above, when its lighting the lamp is to be started, after having been left for long time.

In the above construction, at first, when lighting of the cold-cathode fluorescent lamp 23 is to be started, the change-over circuit 26 of the cold-cathode fluorescent lamp lighting device 20 is changed over so as to connect to the contact 26B, so that the step-up transformation ratio of the high-tension transformer T24 is turned into a step-up transformation ratio which is suited for lighting the lamp. As a result of this, the direct-current constant voltage which is supplied from the constant-voltage power supply 21 is converted into the alternating voltage, by the primary-side first coil TL1A and the primary-side second coil TL1B of the primary coil TL1 of the high-tension transformer T24 on the basis of the operation of the switching circuit part 25. The alternating voltage is boosted into the high-tension alternating voltage of the voltage value which is needed, at a minimum, to start lighting of the cold-cathode fluorescent lamp 23 by the secondary coil TL3 of the high-tension transformer T24, and then supplied to the cold-cathode fluorescent lamp 23.

On the other hand, to maintain lighting of the cold-cathode fluorescent lamp 23, the change-over circuit 26 of the cold-cathode fluorescent lamp lighting device 20 is changed over so as to connect to the contact 26A, so that the step-up transformation ratio of the high-tension transformer T24 is turned into a step-up transformation ratio which is suited for steady-state lighting. As a result of this, the direct-current constant voltage which is supplied from the constant-voltage power supply 21 is converted into the alternating voltage, by the primary-side first coil TL1A and the primary-side third coil TL1C of the primary coil TL1 of the high-tension transformer T24, on the basis of the operation of the switching circuit part 25, and the alternating voltage is boosted into the high-tension alternating voltage of the voltage value which is needed, at a minimum, for maintaining the cold-cathode fluorescent lamp 23 in a lit state, and which is lower than the high-tension alternating voltage for starting its lighting by the secondary coil TL3 of the high-tension transformer T24, and then supplied to the cold-cathode fluorescent lamp 23.

Thus, in the cold-cathode fluorescent lamp lighting device 20, the step-up transformation ratio of the high-tension transformer T24 can be changed over by the change-over circuit 26 of the DC/AC inverter circuit 22, and the minimum high-tension alternating voltages of the voltage values which are needed respectively for lighting and for maintaining lighting of the cold-cathode fluorescent lamp 23 can be supplied to the cold-cathode fluorescent lamp 23. Therefore, the lighting facility of the cold-cathode fluorescent lamp 23 can be maintained, and the efficiency in maintaining lighting can be improved.

In the case where the cold-cathode fluorescent lamp 23 needs a high-tension alternating voltages of, for instance, a voltage value of about 2 KVpp at the time of lighting the lamp and a voltage value of about 1.2 KVpp to keep the lamp lit thereafter, the cold-cathode fluorescent lamp lighting device 20 is able to improve the efficiency—while the lamp is lit—by about 5% to 10%, as compared with the cold-cathode fluorescent lamp lighting device 1 including the conventional constant-output type DC/AC inverter circuit which supplies the high-tension alternating voltage of a voltage value of about 2 KVpp to the cold-cathode fluorescent lamp 23.

Moreover, in the cold-cathode fluorescent lamp lighting device 20, by virtue of the change-over circuit 26 which has been provided in the DC/AC inverter circuit 22, the high-tension alternating voltages of the voltage values which are respectively needed, as the minimum requirements, when lighting the lamp and the keeping the cold-cathode fluorescent lamp 23 lit thereafter can be obtained without changing the voltage value of the direct-current constant voltage which is supplied from the constant-voltage power supply 21. Therefore, an up-converter and a down-converter are not needed in the constant-voltage power supply 21, and the construction of the circuit can be simplified.

According to the above construction, the change-over circuit 26 has been provided in the DC/AC inverter circuit 22, and the step-up transformation ratio of the high-tension transformer T24 is changed over. As a result, the high-tension alternating voltages of the voltage values which are respectively needed, as the minimum requirements, when lighting and the then maintaining lighting of the cold-cathode fluorescent lamp 23 can be obtained with a simple circuit configuration. In this way, a cold-cathode fluorescent lamp lighting device can be realized which is able to light a cold-cathode fluorescent lamp in a highly efficient manner.

(2) The Second Embodiment

Figure 5:
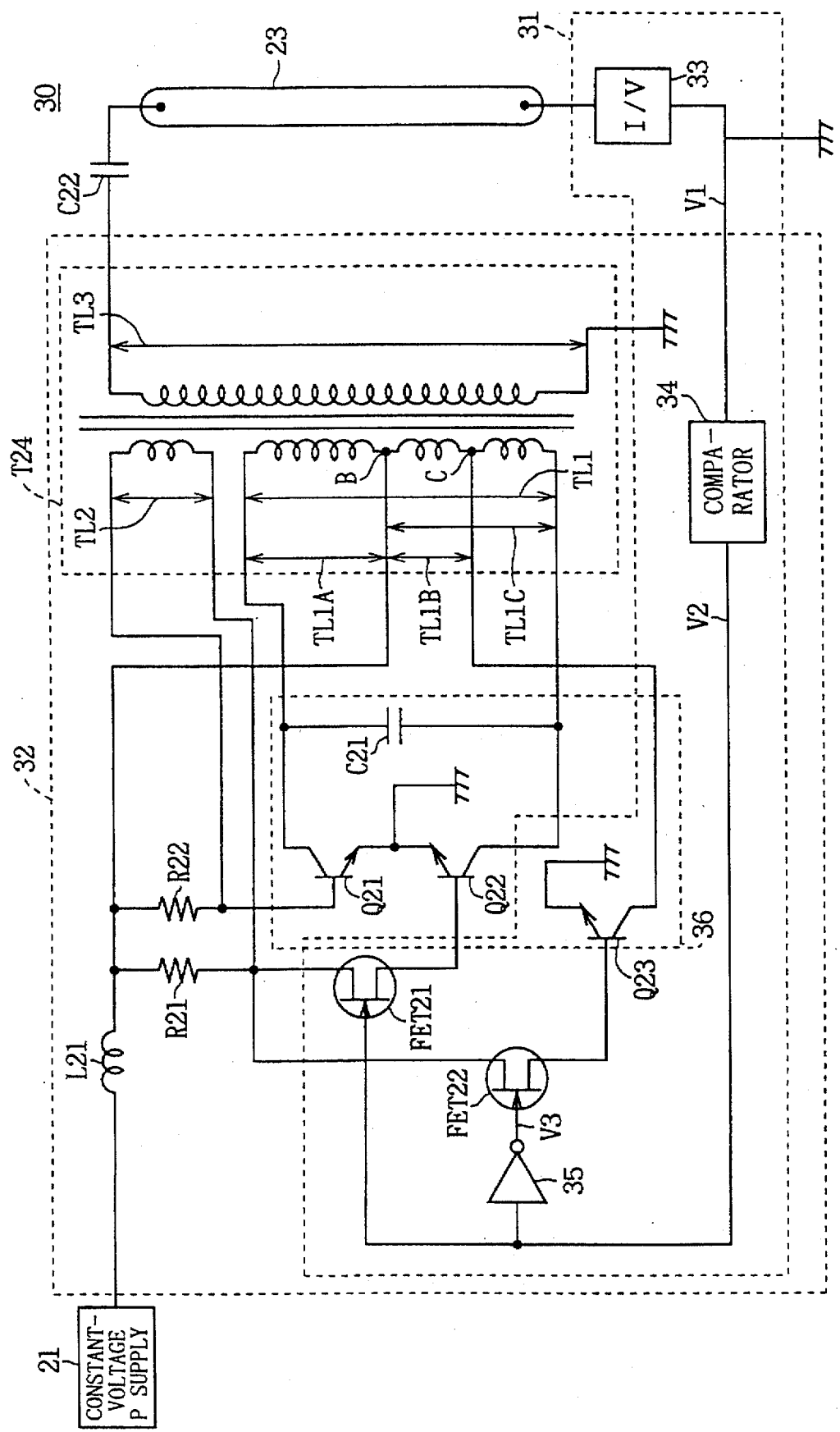
FIG. 5 is a connection diagram showing the circuit configuration of the cold-cathode fluorescent lamp lighting device according to a second embodiment of the present invention.

FIG. 5, which has the same reference numerals as those of FIG. 4 on its portions corresponding to the portions of FIG. 4, shows a cold-cathode fluorescent lamp lighting device 30 according to the second embodiment, which is provided with a DC/AC inverter circuit 32 including a change-over circuit 31 which is able to electrically perform the change-over operation of the change-over circuit 26 of the DC/AC inverter circuit 22.

In this case, the change-over circuit 31 causes an alternating current/direct-current voltage converting circuit (referred to as an I/V converting circuit, hereinafter) 33 to detect whether or not the operating current has flowed through the cold-cathode fluorescent lamp 23 (that is, whether or not the cold-cathode fluorescent lamp 23 has been lit).

The I/V converting circuit 33 converts the detected operating current into the direct-current voltage V1 of the stated value, and supplies it to a comparator 34.

The comparator 34 compares the direct-current voltage V1 with the required reference value, and generates a control voltage V2 of "H" or "L" on the basis of the comparison result. The comparator 34 supplies the control voltage to an inverting circuit 35. In addition to this, the comparator 34 supplies the control voltage V2 to the gate of a field-effect transistor (this is referred to as a FET, hereinafter) 21.

In this case, the comparator 34 generates the control voltage V2 which is based on "L" when it has obtained the direct-current voltage V1 which is based on the case where the I/V converting circuit 33 has not detected the operating current (that is, the case where the cold-cathode fluorescent lamp 23 has not been lit). The comparator 34 generates the control voltage V2 which is based on "H" when it has obtained the direct-current voltage V1 which is based on the case where the I/V converting circuit 33 has detected the operating current (that is, the case where the cold-cathode fluorescent lamp 23 has been lit).

The inverting circuit 35 inverts the control voltage V2 which is based on the supplied "L" or "H" into the control voltage V3 which is based on "H" or "L" respectively, and then supplies it to the gate of a FET FET22.

The FET FET22, whose drain is connected with one end of a switching control coil TL2 and whose source is connected with the base of a transistor Q23, turns ON when it has received the control voltage V3 which is based on "H". As a result of this, the drain-source of FET22 conducts a direct current, and the direct current is introduced to the base of the transistor Q23, so that the transistor Q23 is turned ON.

On the other hand, FET22 turns OFF when it has received the control voltage V3 which is based on "L".

The FET FET21, whose drain is connected with one end of a switching control coil TL2 of the high-tension transformer T24 and whose source is connected with the base of a transistor Q22, turns ON state when it has received the control voltage V2 which is based on "H". As a result of this, the drain-source of FET21 conducts a direct current, and the direct current is introduced to the base of the transistor Q22, so that the transistor Q22 is led turned ON.

On the other hand, FET21 turns OFF when it has received the control voltage V2 which is based on "L".

Thus, in the change-over circuit 31, when initially lighting the cold-cathode fluorescent lamp 23, the operating current does not flow until the cold-cathode fluorescent lamp 23 starts discharging. Therefore, the control voltage V2 which is based on "L" is supplied to the gate of FET21, so as to turn it OFF.

On the other hand, the control voltage V3 which is based on "H" is supplied to the gate of FET22 so as to turn it ON. As a result of this, the FET FET22 turns the transistor Q23 ON.

By this, the switching circuit part 36, which is composed of the transistors Q21, Q22 and Q23, and the DC/AC inverter circuit 32 causes the transistors Q21 and Q23 to operate so as to generate an alternating voltage with a primary-side first coil TL1A and a primary-side second coil TL1B of a primary coil TL1 of the high-tension transformer T24.

In this way, the high-tension transformer T24 boosts the alternating voltage which has been generated with the primary-side first coil TL1A and the primary-side second coil TL1B of the primary coil TL1 into a high-tension alternating voltage of the voltage value which is needed, at a minimum, to start lighting the cold-cathode fluorescent lamp 23, and then supplies the high-tension alternating voltage to the cold-cathode fluorescent lamp 23.

In the change-over circuit 31, when the cold-cathode fluorescent lamp 23 has been lit the operating current flows. Therefore the control voltage V2 which is based on "H" is supplied to FET21 so as to turn it ON, and the FET21 turns the transistor Q22 ON.

On the other hand, FET22 is supplied with the control voltage V3 which is based on "L", and so is turned OFF.

By this, the switching circuit part 36 of the DC/AC inverter circuit 32 causes the transistors Q21 and Q22 to operate, so as to generate an alternating voltage with a primary-side first coil TL1A and a primary-side third coil TL1C of a primary coil TL1 of the high-tension transformer T24.

So, the high-tension transformer T24 boosts the alternating voltage which has been generated with the primary-side first coil TL1A and the primary-side third coil TL1C of the primary coil TL1 into a high-tension alternating voltage of the voltage value which is needed, at a minimum, for maintaining the lit state of the cold-cathode fluorescent lamp 23 and which is lower than the high-tension alternating voltage for starting its lighting. The transformer T24 then supplies the high-tension alternating voltage to the cold-cathode fluorescent lamp 23.

In the above construction, in the cold-cathode fluorescent lamp 23, until the cold-cathode fluorescent lamp 23 is lit the operating current does not flow. The I/V converting circuit 33 of the change-over circuit 31 detects that the operating current is not flowing, and supplies the direct-current voltage V1 which is based on the detection result to the comparator 34. Subsequently, the direct-current voltage V1 is converted into the control voltage V2 which is based on "L" at the comparator 34. The control voltage V2 causes FET21 to go to the OFF state, and causes FET22 to go to the ON state after it has been inverted into the control voltage V3 which is based on "H" through the inverting circuit 35. By this, the direct-current constant voltage which has been supplied to the DC/AC inverter circuit 32 is converted into an alternating voltage by the operations of the transistors Q21 and Q23 of the switching circuit part 36. through The primary-side first coil TL1A and the primary-side second coil TL1B of the primary coil TL1 of the high-tension transformer T24; the alternating voltage is then boosted into a high-tension alternating voltage of the voltage value which is needed, as a minimum requirement, to start lighting of the cold-cathode fluorescent lamp 23 by the secondary coil TL3 of the high-tension transformer T24. The high-tension alternating voltage is then supplied to the cold-cathode fluorescent lamp 23.

On the other hand, in the cold-cathode fluorescent lamp lighting device 30, when the cold-cathode fluorescent lamp 23 has been lit, the operating current which has flowed through the cold-cathode fluorescent lamp 23 is detected by the I/V converting circuit 33 of the change-over circuit 31 and then converted into the direct-current voltage V1 which is based on the operating current. The direct-current voltage V1 is converted, at the comparator 34, into the control voltage V2 which is based on "H". The control voltage V2 causes FET21 to go to ON the state, and, after it has been inverted into the control voltage V3 which is based on "L" through the inverting circuit 35, causes FET22 to go to the OFF state. By this, the direct-current constant voltage which has been supplied to the DC/AC inverter circuit 32 is converted into an alternating voltage by the operations of the transistors Q21 and Q22 of the switching circuit part 36 by the primary-side first coil TL1A and the primary-side third coil TL1C of the primary coil TL1 of the high-tension transformer T24. The alternating voltage is then boosted into a high-tension alternating voltage of the voltage value which is needed, as a minimum requirement, for maintaining lighting of the cold-cathode fluorescent lamp 23, by the secondary coil TL3 of the high-tension transformer T24. The high-tension alternating voltage is then supplied to the cold-cathode fluorescent lamp 23.

In this case, in the cold-cathode fluorescent lamp lighting device 30, a direct-current voltage which is supplied to the constant-voltage power supply 21 is not varied in response to the state of lighting of the cold-cathode fluorescent lamp 23, but converted into the fixed direct-current constant voltage, and then supplied to the DC/AC inverter circuit 32 by the constant-voltage power supply 21. The voltage value of the high-tension alternating voltage can be changed over in an instant, in accordance with whether it is time to start lighting or maintain lighting of the cold-cathode fluorescent lamp 23. Therefore, the electric power consumption of the cold-cathode fluorescent lamp lighting device 30 can be diminished. Thus, the electric power consumption of a VTR which is integrated with camera can be also diminished.

Therefore, in the VTR integrated with camera which utilizes the cold-cathode fluorescent lamp lighting device 30, it is possible to lengthen the life of a battery which is used as the power source, and to diminish the quantity of heat which is internally generated.

As to the cold-cathode fluorescent lamp lighting device 20 according to the first embodiment, it is feared that the user may forget to operate the change-over circuit 26 which has been placed in the DC/AC inverter circuit 22 in response to the state of lighting of the cold-cathode fluorescent lamp 23.

However, in the cold-cathode fluorescent lamp lighting device 30, since the change-over circuit 31 which has been located in the DC/AC inverter circuit 32, automatically performs the change-over controlling on the basis of detection of the operating current which is corresponding to the state of lighting of the cold-cathode fluorescent lamp 23 (that is, whether it is lit or not), the high-tension alternating voltages of the voltage values which are respectively needed, as the minimum requirements, at the time to start lighting and the time of maintaining lighting of the cold-cathode fluorescent lamp 23 can be automatically supplied to the cold-cathode fluorescent lamp 23.

According to the above construction since the change-over circuit 31 of which change-over controlling is performed in response to the operating current of the cold-cathode fluorescent lamp 23 is placed in the DC/AC inverter circuit 32, and the step-up transformation ratio of the high-tension transformer T24 is changed over, the high-tension alternating voltages of the voltage values which are respectively needed, as the minimum requirements, at the time to start lighting and the time of maintaining lighting of the cold-cathode fluorescent lamp 23 can be generated. In this way a cold-cathode fluorescent lamp lighting device which is capable of high efficiency lighting of a cold-cathode fluorescent lamp can be realized.

(3) Other Embodiments

The second embodiment described above has dealt with the case where the change-over circuit 36 performs change-over controlling of the switching circuit part 36, which has been provided in the DC/AC inverter circuit 32, on the basis of detection of the operating current which corresponds to the state of lighting of the cold-cathode fluorescent lamp 23. However, the present invention is not limited to this, but the change-over circuit 36 can be adapted to perform change-over controlling of the switching circuit part 36, which has been provided in the DC/AC inverter circuit 32, on the basis of, for instance, detection of light which is based on lighting of the cold-cathode fluorescent lamp 23.

The first and second embodiments described above have dealt with the case where the cold-cathode fluorescent lamp lighting device 20 and 30 is applied to a VTR integrated with camera. However, the present invention is not limited to this, and it can be applied to various apparatuses which utilize an LCD panel, such as a liquid-crystal small-size television, a portable video tape recorder, and a note-book type personal computer.

The first and second embodiments described above have dealt with the case where the primary-side second coil TL1B and the primary-side third coil TL1C of the primary coil TL1 of the high-tension transformer T24 are changed over to and from by means of the change-over circuit 26 and 31. However, the present invention is not limited to this, but in addition to the primary-side second coil TL1B and the primary-side third coil TL1C, the primary-side first coil TL1A of the primary coil TL1 can be provided with an intermediate tap and a change-over circuit as well, and the primary-side first coil TL1A and a coil which is lying between one end of the primary coil TL1 and the intermediate tap may be changed over to and from. By this, even such a case can be easily dealt with that the voltage value of the high-tension alternating voltage which is needed, as the minimum requirement, depending on the state of lighting of the cold-cathode fluorescent lamp which is the lighting object.

The first and second embodiments described above have dealt with the case where the first intermediate tap B and the second intermediate tap C have been placed respectively on the position of one-half turns and the position of one-fourth turns of the primary coil TL1 of the high-tension transformer T24. However, the present invention is not limited to this. Taps can be placed on various positions in the primary coil TL1 of the high-tension transformer T24, so long as the high-tension alternating voltage of the voltage value which is needed, as the minimum requirement, depending on the state of lighting of the cold-cathode fluorescent lamp which is the lighting object, can be obtained.

The first and second embodiments described above have dealt with the case where the switching circuit 25 and 36 has been provided as a voltage converting means for converting a direct-current voltage into an alternating voltage. However, the present invention is not limited to this, and the other various voltage converting means can be provided so long as it is able to convert the direct-current voltage into the alternating voltage.

The first and second embodiments described above have dealt with the case where the high-tension transformer T24 has been provided as a transforming means for boosting an alternating voltage into the stated high-tension alternating voltage. However, the present invention is not limited to this, and the other various transforming means can be provided so long as it is able to boost the alternating voltage into the stated high-tension alternating voltage.

As stated above, according to the present invention, the direct-current voltage is converted into the alternating voltage by the voltage converting means, and when the alternating voltage is boosted to the stated high-tension alternating voltage by the transforming means, the ratio of step-up transformation by the transforming means with respect to the alternating voltage is adjusted by the change-over means, so that the alternating voltage is boosted into the first high-tension alternating voltage at the time to start lighting the cold-cathode fluorescent lamp, and the alternating voltage is boosted into the second high-tension alternating voltage to maintain lighting of the cold-cathode fluorescent lamp. Therefore the first high-tension alternating voltage and the second high-tension alternating voltage of the voltage values which are respectively needed, as the minimum requirements, at the time to start lighting and the time of steady-state lighting of the cold-cathode fluorescent lamp can be obtained with the simple circuit constitution. In this way, a cold-cathode fluorescent lamp lighting device which is capable of high-efficiency lighting of a cold-cathode fluorescent lamp can be realized.

While there has been described in connection with the preferred embodiments of the invention, it will be obvious to those skilled in the art that various changes and modifications may be made. Therefore, the appended claims are intended to cover all such changes and modifications as fall within the true spirit and scope of the invention.

What is claimed is:

1. A cold-cathode fluorescent lamp lighting device which converts a direct-current voltage into an alternating voltage and supplies it to a cold-cathode fluorescent lamp, comprising:

voltage converting means for converting said direct-current voltage into said alternating voltage;

voltage transforming means for boosting said alternating voltage into a high-tension alternating voltage; and change-over means for adjusting a step-up transformation ratio of said voltage transforming means to change said alternating voltage into a first high-tension alternating voltage or into a second high-tension alternating voltage having a voltage value lower than that of the first high-tension alternating voltage;

wherein said change-over means changes said alternating voltage into said first high-tension alternating voltage when lighting of said cold-cathode fluorescent lamp is to be started, and changes said alternating voltage into said second high-tension alternating voltage to maintain lighting of said cold-cathode fluorescent lamp.

2. The cold-cathode fluorescent lamp lighting device according to claim 1, wherein said change-over means detects an operating current which flows on the basis of lighting of said cold-cathode fluorescent lamp, and changes said alternating voltage into said first high-tension alternating voltage and said second high-tension alternating voltage depending on the detected operating current.

3. The cold-cathode fluorescent lamp lighting device according to claim 1, wherein said change-over means detects the light which is emitted by lighting of said cold-cathode fluorescent lamp, and changes said alternating voltage into said first high-tension alternating voltage and said second high-tension alternating voltage depending on the detected light.

4. The cold-cathode fluorescent lamp lighting device according to claim 1, wherein said voltage transforming means is a high-tension transformer.

5. The cold-cathode fluorescent lamp lighting device according to claim 4, wherein said voltage transforming means comprises:

a primary coil having a predetermined number of turns, a first tap supplied with said direct-current voltage at a predetermined place between a first side and a second side of the coil, and a second tap at a predetermined place between said first tap and said second side of the coil;

a control coil for controlling said voltage converting means such that the direct current which is corresponding to said direct-current voltage supplied to said first tap of said primary coil flows alternately in a direction from said first tap to said first side of said primary coil and in a direction from said first tap to said the second side of said primary coil; and a secondary coil having a predetermined number of turns more than that of said primary coil, to which said cold-cathode fluorescent lamp is connected.

6. The cold-cathode fluorescent lamp lighting device according to claim 5, wherein said voltage converting means comprises:

a first transistor;

a second transistor; and a capacitor having a predetermined capacity, wherein:

said first transistor is connected at its base to a first side of said control coil of said voltage transforming means, connected at its emitter to a ground, and connected at its collector to said capacitor and said first side of said primary coil of said voltage transforming means; and said second transistor is connected at its base to the second side of said control coil of said voltage transforming means, connected at its emitter to a ground, and connected at its collector said capacitor and said second side of said primary coil of said voltage transforming means via said change-over means or said second tap.

7. The cold-cathode fluorescent lamp lighting device according to claim 5, wherein said change-over means is a switch for changing over the connection between said the second side of said primary coil of said voltage transforming means and said second tap manually.

8. The cold-cathode fluorescent lamp lighting device according to claim 5, wherein said voltage converting means comprises:

a first transistor;

a second transistor;

a third transistor; and a capacitor having a predetermined capacity, wherein:

said first transistor is connected at its base to first side of said control coil of said voltage transforming means, connected at its emitter to a ground, and connected at its collector to said capacitor and said first side of said primary coil of said voltage transforming means; said second transistor is connected at its base to the second side of said control coil of said voltage transforming means, connected at its emitter to a ground, and connected at its collector to said capacitor and said second side of said primary coil of said voltage transforming means; and said third transistor is connected at its base to said second side of said control coil of said voltage transforming means, connected at its emitter to a ground, and connected at its collector to said second tap of said primary coil of said voltage transforming means.

9. The cold-cathode fluorescent lamp lighting device according to claim 8, wherein said change-over means comprises:

current voltage converting means for detecting the alternating current which flows when said cold-cathode fluorescent lamp lights and for converting said detected alternating current into a predetermined direct-current voltage;

a comparator for generating a control voltage of a predetermined first level or second level based on the value of said direct-current voltage obtained from said current voltage converting means;

inverting means for inverting said first level or second level of said control voltage obtained from said comparator; and a first and second field effect transistors for adjusting the ratio of step-up transformation against said alternating voltage by said voltage transforming means, based on said control voltage obtained from said inverting means in which said first or second level is inverted, wherein:

said first field effect resistor is connected at its gate to an output side of said comparator, connected at its drain to said second side of said control coil of said voltage transforming means, and connected at its source to said base of said second transistor of said voltage converting means; and said second field effect transistor is connected at its gate to an output side of said inverting means, connected at its drain to said second side of said control coil of said voltage transforming means, and connected at its source to said base of said third transistor of said voltage converting means.

* * * * *